March 2, 1971  TSUNEO KAWABE  3,567,289
HYDRAULIC BRAKE PRESSURE CONTROL VALVE ASSEMBLY
Filed May 20, 1969

United States Patent Office 3,567,289
Patented Mar. 2, 1971

3,567,289
HYDRAULIC BRAKE PRESSURE CONTROL VALVE ASSEMBLY
Tsuneo Kawabe, % Aisin Seiki Company Limited, 1, 2-chome, Asahi-machi, Kariya-shi, Aichi-ken, Japan
Filed May 20, 1969, Ser. No. 826,118
Claims priority, application Japan, May 25, 1968, 43/35,591
Int. Cl. B60t 8/26
U.S. Cl. 303—6                                                     7 Claims

ABSTRACT OF THE DISCLOSURE

A hydraulic brake pressure control valve assembly comprising a stepped hydraulic piston and a control valve which is on-off controlled repeatedly by the reciprocating movement of said piston and beyond a predetermined hydraulic brake pressure value and for gradually increasing the hydraulic pressure for automotive rear wheels so far as a continued and considerable brake application is being performed, wherein the improvement resides in such a point that the valve and its return spring are mounted within a valve chamber formed in a plug member closing an open end of a cylinder which houses slidably said piston, the latter being arranged and mounted axially in opposition to said valve and its return spring, for making main working parts, especially said piston, easier to manufacture and assemble, in addition to make the whole control valve assembly in a highly compact and simple design.

---

This invention relates to improvements in and relating to hydraulic brake pressure control devices, especially for use in automotive wheel brake systems.

In conventional vehicle hydraulic brake systems, equal hydraulic pressures are generally delivered to the front and rear wheel cylinders upon operation of the pressure generating means such as a foot pedal-operated hydraulic master cylinder, a brake booster assembly or power operated mechanism.

It is well known that in a substantial brake application, a heavier braking of the rear wheels may frequently occur, leading under most occasions to the disadvantageous locking and sliding of the rear wheels. This defective braking is largely enhanced by the fact that there is substantial weight shift during the brake application, thus causing the weight supported by the rear wheels being correspondingly reduced.

In order to avoid occurrence of these drawbacks, various means have been proposed and are now in broad use, which are capable of limiting the supply of hydraulic pressure to the rear wheel cylinders relative to that in the front wheel cylinders and beyond a certain point, so as to provide a correction of the rear wheel cylinder pressure for reducing the possibility of rear wheel skid.

The said hydraulic pressure limiting means are shaped generally into a proportionator in the form of a hydraulic pressure control valve assembly inserted in piping means for reducing the hydraulic braking pressure delivered from the master cylinder to the rear wheel cylinders upon intentional increase of the master cylinder pressure beyond a predetermined value, said assembly comprising a stationary cylinder opened at its one end only; a plug closing said open cylinder end; a stepped piston slidably mounted in said cylinder; actuating spring urging said piston towards to its rest position; a first hydraulic chamber fluidically connected to said master cylinder; a second hydraulic chamber fluidically connected to said rear wheel cylinders and a valve provided in communication passage between said both hydraulic chambers and controlled to open and close by the reciprocating movement of said piston.

Conventional pressure control valve assemblies of the above kind have however such a drawback that the design and arrangement of the constituents are highly complicated and the manufacture of these valve assemblies is highly uneconomical. The drawback has been invited by the provision of the valve and its return spring within the interior of the said stepped piston. In addition, various constituents of the valve assembly have been designed in an asymmetrical manner which has accentuated considerably the aforementioned drawback.

It is therefore the main object of the invention to provide a hydraulic pressure control valve assembly which is highly easy to manufacture, especially in the stage of mechanical working and assembling its substantial constitutents.

A further object is to provide the pressure control valve assembly of the above kind which is additionally highly compact in its overall dimensions, yet without loss of its efficient working performance.

For attaining the above mentioned objects, the invention, starting from the known pressure control valve assembly, is characterized by that said valve and its return spring are arranged within a valve chamber formed in said plug and in opposition to said piston.

Additionally, the invention is further characterized by that all the constituents of said assembly, except pipings and ports for hydraulic connection between said chambers are designed and arranged in a symmetrical way relative to the longitudinal axis of said assembly.

These and further objects, features and advantages of the invention will appear from the following detailed description of the invention by reference to the accompanying drawing which constitutes a part of the present specification.

Figure 1:
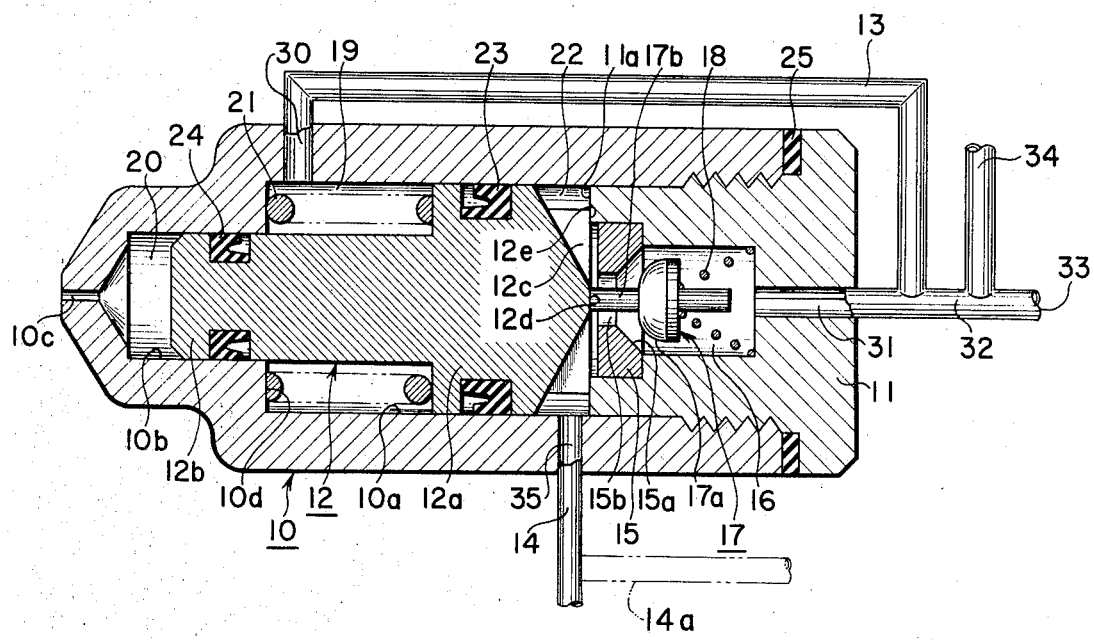
FIG. 1 is substantially axial section of a preferred embodiment of the hydraulic pressure control valve assembly as constructed according to the teaching of the invention, wherein however the valve is shown in its open position with its hydraulic piston placed in its rest position.

Referring now to the drawing, especially FIG. 1 thereof, numeral 10 denotes a hollow cylindrical member which is substantially closed at its left-hand end and opened at its right-hand end, the latter end being however closed tightly by a screw plug 11 and a resilient sealing ring 25 squeezed under pressure between the cylinder 10 and the plug 11 as shown. The closed end of the cylinder 10 is formed with a breathing port 10c axially bored through the corresponding cylinder wall, the purpose of the provision of this port 10c being described more in detail hereinafter. The interior space of cylinder 10 is formed into a stepped one and houses slidably a stepped piston 12 comprising a larger diameter piston element 12a and a smaller diameter piston element 12b sealingly and slidably cooperating with larger bore 10a and smaller bore 10b of the cylinder, respectively. For the sealing purpose, the larger and smaller piston elements are provided as conventionally with respective sealing rings 23 and 24. On the larger piston head, the piston 12 is formed with a plurality of radially extending oil grooves 12c of which only two diametrally oppositely arranged are shown specifically.

At the left-hand end of the larger cylindrical bore 10a, a port 30 is provided which passes through the cylinder wall and a conduit 13 extends from said port to a further port 31 formed axially in the plug 11 and kept in communication with a valve chamber 16 in the plug. From a junction point 32 of the conduit 13 a piping 34 extends upwards in FIG. 1 and leads to conventional hydraulic cylinders, not shown, for front wheels of the automotive vehicle on which the present pressure control assembly is mounted, although the details have been omitted from the drawing only for simplicity. From the piping 34, a further piping 33 is branched off and leads to a conventional hydraulic master cylinder, not shown.

The cylinder 10 is formed with a second port 35 bored laterally through the cylinder wall nearly at the right-hand end of the larger cylindrical bore 10a, a further piping 14 extending from the port to the conventional hydraulic rear or drive wheel cylinders, not shown, of the automotive vehicle.

A valve seat member 15 is fixedly attached centrally to the inside end of the plug 11 and formed with a coned valve seat surface 15a and an axially extending central bore 15b, said seat surface being exposed to the valve chamber 16.

A valve member 17 made preferably of synthetic resin is movably mounted within said chamber 16 and formed with a spherical valve surface 17a adapted for cooperation with said coned seat surface 15a when the valve is closed as will be described more in detail hereinafter by reference to FIG. 2.

A compression coil spring 18 is provided between the end wall of said valve chamber 16 and said valve member 17, thereby the latter being urged to move leftwards in FIG. 1 in the valve closing direction. The left-hand stem end 17b is kept in pressure contact with the right-hand extremity of piston 12 at 12d.

A variable ring space defined by the smaller piston element 12b, on the one hand, and by the larger cylindrical bore wall of said cylinder 10, on the other hand, is denoted with the numeral 19, while a variable smaller cylinder space between the left-hand cylinder end wall and the left-hand end of said piston is denoted with the numeral 20. The ring space 19 is filled with a hydraulic pressure liquid such as oil, while the smaller cylinder space 20 is kept in communication through said breathing port 10c with ambient atmosphere.

Within the ring space 19, there is provided a compression coil spring 21 which abuts, on the one hand, against the stepped shoulder 10d of cylinder 10, and against the larger piston element 12a, on the other hand, the piston being thereby urged resiliently to move rightwards and abutting normally with its right-hand extremity 12e against the inner end 11a. Under these conditions, the piston 12 cooperates at its central area 12d of the piston head with the valve stem 17b in such a way that the spherical surface of valve member 17 is physically separated from the coned surface 15a of valve seat member 15 against the action of the urging spring 18, as clearly seen from FIG. 1.

Numeral 22 denotes a ring chamber defined by the inside cylinder wall surface, the piston head 12a and the closing plug 11 and kept normally in hydraulic communication with rear wheel cylinders, not shown, through port 35 and the connecting piping 14.

The operation of the pressure control valve assembly so far shown and described is as follows:

When the vehicle driver actuates a conventional foot-operated pedal for actuating the hydraulic wheel brake system, pressure oil is fed from the master cylinder, not shown, through pipings 33 and 34 directly to the front wheel cylinders, and at the same time, it is conveyed further through the junction 32 and port 31 into valve chamber 16, on the one hand, and through the piping 13 and port 30 into the ring cylinder space 19. With relatively low hydraulic pressure, oil will be conveyed from the valve chamber 16, the now opened valve gap passage between valve spherical surface 17a and coned seat surface 15a, valve bore passage 15b around stem 17b, radial passage grooves 12c on piston head, ring cylinder space 22, port 35 and connecting piping 14 into the rear wheel cylinders. With continued depression of the foot pedal and thus with higher hydraulic brake pressure from the master cylinder, beyond a predetermined pressure, the piston 12 will be moved hydraulically towards left in FIG. 1 and against the action of return spring 21.

Now assuming that D and d represent the larger and the smaller piston diameter, respectively; $P_1$ and $P_2$ the hydraulic pressures prevailing in ring spaces 22 and 19, respectively; and F denotes the spring pressure at 21, then we can obtain the following Equation 1 when observing the leftwardly and rightwardly acting forces on the hydraulic piston 12.

$$\pi/4 \cdot D^2 \cdot P_1 = \pi/4 \cdot (D^2 - d^2)P_2 + F \quad (1)$$

When denoting:

$$\pi/4 \cdot D^2 = S \text{ and } \pi/4 \cdot d^2 = s$$

then $$SP_1 = (S-s)P_2 + F \quad (2)$$

At this stage, $P_1 = P_2$ and we can obtain the following relation from Equation 2, $$sP_1 = F \quad (3)$$

Thus, it will be seen from the foregoing that upon the master cylinder pressure attaining a predetermined value which may be denoted $P_x$, the piston will be moved leftwards by virtue of $SP_1 > F$ and $S > s$.

Figure 2:
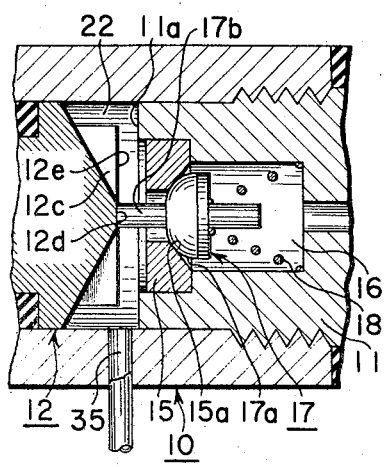
FIG. 2 is a part of the valve assembly shown in FIG. 1, wherein however the valve is placed in its closed position.

With the leftward movement of the piston 12 against the action of return spring 21, the spherical surface 17a of valve member 17 is finally brought into pressure contact with coned seat surface 15a of valve seat member 15, thus the flow of the hydraulic pressure liquid from the master cylinder into the ring cylinder space 22 is interrupted, as clearly supposed from FIG. 2. With further continuation of foot pedal depression, the correspondingly increased hydraulic pressure will act upon the valve member 17 in valve chamber 16, on the one hand, and upon the stepped piston surface exposed to the pressure liquid prevailing in the ring cylinder space 19, on the other hand. Since the spring force at 18 has been selected considerably smaller than that at 21, the increased hydraulic pressure will become predominant for urging the piston 12 and thus the valve member 17 to move in its valve opening direction or rightwards in FIG. 2.

Figure 3:
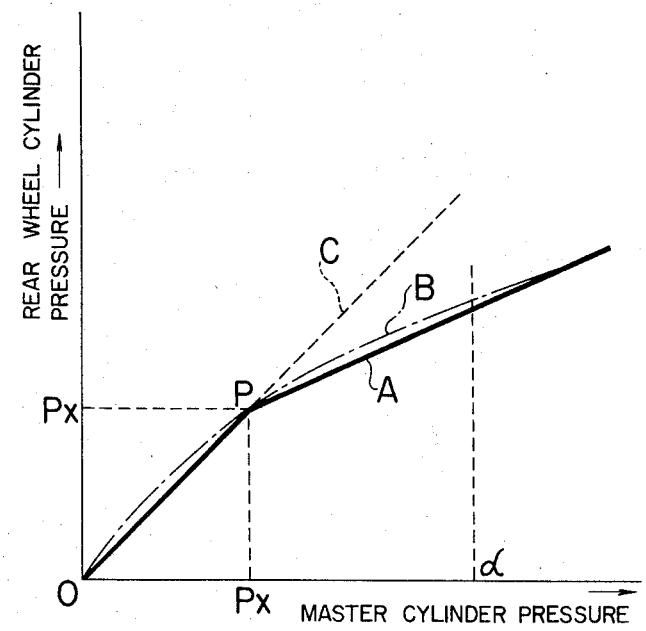
FIG. 3 is a chart showing a representative performance curve of the pressure control valve assembly, wherein the rear wheel cylinder pressure has been plotted against the front wheel cylinder pressure, the chart being drawn however on a random scale.

By this rightward movement, the closed valve passage between spherical surface 17a and coned seat surface 15a is reopened, thus the hydraulic increased pressure from the master cylinder being again conveyed into the ring cylinder space 22 and thence to the rear wheel cylinders. In this way, the rear wheel cylinder pressure will be increased through a practically infinitely repeated cycles of pressure increase interruption and pressure reincrease caused by the reciprocating movement of the valve member 17 of a certain small stroke at a relatively high frequency, against and remote from the coacting valve seat, so far as the driver's braking effort through depression of foot brake pedal is continued to make. This hydraulic pressure increasing mode for the rear wheel cylinders beyond a certain predetermined point $P_x$ is expressed generally by an increasingly inclined curve at A shown in FIG. 3, when neglecting the pressure fluctuations caused by the aforementioned high frequency reciprocating movement of valve member 17, while during the corresponding operational stage the front wheel cylinder pressure increase will take place along a more steep curve C shown in a dotted line. In FIG. 3, a curve B is also shown with a chain line which represents an ideal brake performance curve for the rear wheels. As seen, the broken line O-P-A varies nearly along the ideal curve so that an optimal brake operation can be assured according to this invention by using a highly simple and compact control valve assembly as proposed. The slope of the curve A when generally seen as a straight line, depends largely upon the selected values of D and $d$, as well as the spring force at 18 in FIGS. 1 and 2.

It will be clear from the foregoing that the valve and the piston are arranged axially in an opposite arrangement to each other and that said valve is mounted within the valve space formed in the cylinder-closing plug. By adopting this measure, a possibility for mechanical working and assembling several main constituent parts, especially the stepped hydraulic piston can be provided, thereby serving for attaining the overall symmetrical construction and arrangement of main constituting working parts, except hydraulic communication means necessary to provide between said both hydraulic chambers, and without loss of the effective pressure control performance of the valve assembly.

It can be further noted from the foregoing that although the hydraulic pressure delivered from the master cylinder is directly fed to the front wheel cylinders, the same as supplied from the master cylinder to the rear wheel cylinders is, upon attaining a predetermined value, reduced in its pressure by the provision of the pressure control valve assembly according to this invention, so as to provide a favorable working performance curve substantially in resemblance to the ideal one, as was described hereinbefore by reference to FIG. 3. The ideal brake performance curve represents optimumly distributed braking efforts to be applied to the vehicle front wheels and rear wheels as being determined theoretically or empirically in consideration of possible load transfer from the rear wheel side to the front wheel side caused by the vehicle inertia appearing in case of the application of a sudden and considerable hydraulic braking action upon the vehicle wheels. In this case, when the practically usable hydraulic braking pressures are less than that corresponding to a certain upper limit $\alpha$ as measured in the master cylinder, the aforementioned brake performance curve A is to be set always to lie below said ideal performance curve B. When even a part of the curve A should lie above said curve B, the rear vehicle wheels may frequently be suffered from skidding.

In a slightly modified arrangement, the piping 14 may be connected to the master cylinder in place of the rear wheel cylinders and the piping 33 may be connected to front vehicle wheel cylinders in place of the master cylinder, after the branch piping 34 having been plugged. In addition, the piping 14 may be connected, at a proper point in advance of the port 35, to the rear wheel cylinders, as hinted at 14a shown by imaginary lines. In this modified embodiment, the rear wheel cylinders are fed directly with the hydraulic master cylinder pressure, while the front wheel cylinders are supplied with an increased hydraulic pressure when the master pressure increases beyond a certain predetermined value during continued considerable actuation of the braking system. In this case, the valve assembly acts as proportionator as before, yet in the sense of a kind of pressure booster, in place of the pressure reducer in the foregoing embodiment.

What I claim is:

1. A hydraulic brake pressure control valve assembly located in a hydraulic pressure line between a brake pressure apply means and the rear wheel brake actuating cylinders of a vehicle, said pressure control valve assembly comprising, a housing having a first and a second cylindrical bore located therein, said second cylindrical bore having a larger diameter than said first cylindrical bore and being in axial alignment therewith, a stepped piston slidably mounted in said second cylindrical bore, said stepped portion of said piston extending axially into said first bore, said piston defining a ring space and a ring chamber in said second bore, a valve chamber formed in said housing assembly adjacent said ring chamber and in fluid communication therewith, a first hydraulic connecting means communicating said brake pressure apply means with said valve chamber and said ring space, said brake pressure apply means further communicating with the front wheel brake actuating cylinders of said vehicle, a second hydraulic connecting means communicating said ring chamber with said rear wheel brake apply cylinders, valve means located in said valve chamber for blocking communication of said valve chamber with said ring chamber when the hydraulic pressure created by said brake pressure apply means exceeds a predetermined value, whereby, upon actuation of the brake pressure apply means to apply the front and rear wheel brakes, the hydraulic pressure from said pressure apply means is applied to both the ring space and ring chamber, thereby causing said stepped piston to be moved in the direction of said ring space and said valve means acts to block communication between said valve chamber and said ring chamber to prevent the hydraulic pressure supplied to the rear wheel brake actuating cylinders from increasing as rapidly as the hydraulic pressure applied to the front wheel brake actuating cylinders.

2. A hydraulic brake pressure control valve assembly as claimed in claim 1, wherein said valve means is operatively connected to said stepped piston to block the flow of hydraulic pressure from said valve chamber to said ring chamber when said stepped piston is caused to be moved toward said ring space by the application of increased hydraulic pressure from said brake pressure apply means.

3. A hydraulic brake pressure control valve assembly as claimed in claim 1, further comprising a spring means located in said ring space for biasing said stepped piston toward said ring chamber.

4. A hydraulic brake pressure control valve assembly as claimed in claim 1, wherein said housing assembly is open at the end thereof opposite to said first bore, and further comprising a plug means closing said open end, said valve chamber being formed in said plug means.

5. A hydraulic brake pressure control valve assembly as claimed in claim 4, wherein said valve means comprises a valve seat positioned in said plug means between said valve chamber and said stepped piston, and a valve member connected to said stepped piston and movably positioned within said valve chamber for engagement with said valve seat to block the flow of hydraulic pressure from said valve chamber to said ring chamber.

6. A hydraulic brake pressure control valve assembly as claimed in claim 1, wherein said stepped piston further comprises a plurality of radially extending grooves formed in the end of said piston positioned within said ring chamber.

7. A hydraulic brake pressure control valve assembly as claimed in claim 1, wherein said first bore is opened to the atmosphere.

References Cited

UNITED STATES PATENTS

| | | | |
|---|---|---|---|
| 1,408,926 | 5/1920 | Bastian | 137—505.15 |
| 2,674,829 | 4/1954 | St. Clair | 137—505.42 |
| 2,868,224 | 1/1959 | Karlsson et al. | 137—505.42X |
| 3,033,229 | 5/1962 | Ramage | 137—505.15X |
| 3,179,123 | 4/1965 | Kowalski et al. | 137—505.42X |
| 3,304,130 | 2/1967 | Doerfler | 60—545X |
| 3,459,000 | 8/1969 | Oberthur | 60—54.5 |

GEORGE E. A. HALVOSA, Primary Examiner

J. J. McLAUGHLIN, Assistant Examiner

U.S. Cl. X.R.

60—54.5; 137—505.15, 505.42; 188—152